US012658555B2

(12) United States Patent
Nakaji et al.

(10) Patent No.: US 12,658,555 B2
(45) Date of Patent: Jun. 16, 2026

(54) ANTENNA MODULE AND ANTENNA COMPONENT

(71) Applicant: Murata Manufacturing Co., Ltd., Nagaokakyo (JP)

(72) Inventors: Hiroyuki Nakaji, Nagaokakyo (JP); Takuya Maekawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 59 days.

(21) Appl. No.: 18/648,837

(22) Filed: Apr. 29, 2024

(65) Prior Publication Data

US 2024/0275017 A1 Aug. 15, 2024

Related U.S. Application Data

(63) Continuation of application No. PCT/JP2022/038320, filed on Oct. 14, 2022.

(30) Foreign Application Priority Data

Nov. 12, 2021 (JP) ................................ 2021-184483

(51) Int. Cl.
*H01Q 1/02* (2006.01)
*H01Q 1/22* (2006.01)

(52) U.S. Cl.
CPC ................. *H01Q 1/02* (2013.01); *H01Q 1/22* (2013.01)

(58) Field of Classification Search
CPC .......... H01Q 1/02; H01Q 1/22; H01Q 1/2283; H01Q 21/065
See application file for complete search history.

(56) References Cited

U.S. PATENT DOCUMENTS 9,614,271 B2 4/2017 Nakano et al.
10,700,406 B2 6/2020 Imai et al.
(Continued)

FOREIGN PATENT DOCUMENTS

CN 104157618 A * 11/2014 ........... H01L 23/552
JP H10-125830 A 5/1998
(Continued)

OTHER PUBLICATIONS

International Search Report received for PCT Patent Application No. PCT/JP2022/038320, mailed on Dec. 6, 2022, 3 pages (English Translation only).

*Primary Examiner* — Seokjin Kim
(74) *Attorney, Agent, or Firm* — ArentFox Schiff LLP

(57) ABSTRACT

An antenna module is provided that includes a first circuit board that includes an antenna that transmits and/or receives an electromagnetic wave or a magnetic field, a second circuit board that faces the first circuit board and when viewed in an up and down direction and overlaps with the first circuit board, an electrically connecting member that electrically connects the first circuit board to the second circuit board. A semiconductor integrated circuit is provided and a first metal case covers the semiconductor integrated circuit. The first metal case and the semiconductor integrated circuit are both mounted either a first lower main surface or a second upper main surface. A heat conductive path conducts heat between the first circuit board and the second circuit board and passes through a solid including the first metal case.

18 Claims, 10 Drawing Sheets

(56) References Cited

U.S. PATENT DOCUMENTS

| | | | | |
|---|---|---|---|---|
| 2014/0091983 | A1* | 4/2014 | Nakano | H01Q 1/24 343/906 |
| 2018/0301799 | A1 | 10/2018 | Imai et al. | |
| 2020/0161749 | A1* | 5/2020 | Onaka | H01Q 21/24 |
| 2021/0351503 | A1 | 11/2021 | Miyagawa et al. | |
| 2022/0216585 | A1 | 7/2022 | Gouchi et al. | |
| 2024/0186693 | A1 | 6/2024 | Miyagawa et al. | |

FOREIGN PATENT DOCUMENTS

| | | | |
|---|---|---|---|
| JP | 4737580 | B2 * | 8/2011 |
| JP | 2012-079468 | A | 4/2012 |
| JP | 2014-072363 | A | 4/2014 |
| WO | 2017/098719 | A1 | 6/2017 |
| WO | 2020/153068 | A1 | 7/2020 |
| WO | 2021/059671 | A1 | 4/2021 |

* cited by examiner

ANTENNA MODULE AND ANTENNA COMPONENT

CROSS REFERENCE TO RELATED APPLICATIONS

The present application is a continuation of PCT/JP2022/038320 filed Oct. 14, 2022, which claims priority to Japanese Patent Application No. 2021-184483, filed Nov. 12, 2021, the entire contents of each of which are incorporated herein by reference.

TECHNICAL FIELD

The present disclosure relates to an antenna module and an antenna component including an antenna.

BACKGROUND

Japanese Patent Application Publication No. 2014-72363 (hereinafter "Patent Document 1") describes an existing antenna module. The composite module described in Patent Document 1 includes a circuit board, an antenna, an IC for wireless communication, a metal case, and a heat dissipating member. The antenna and the IC for wireless communication are mounted on the circuit board. The metal case covers the IC for wireless communication. The heat dissipating member is in contact with the IC for wireless communication and the metal case. As a result, heat generated by the IC for wireless communication is conducted to the metal case through the heat dissipating member. Thus, the heat generated by the IC for wireless communication is radiated into the atmosphere.

For designs such as the composite module described in Patent Document 1, there is a demand for reduction in size of the composite module, improvement of the communication characteristics, and improvement of heat dissipation.

SUMMARY OF THE INVENTION

Accordingly, exemplary aspects of the present disclosure provide an antenna module and an antenna component that reduce the size of the antenna module, improves the communication characteristics, and improves heat dissipation.

In an exemplary aspect, an antenna module is provided that includes a first circuit board that has a first upper main surface and a first lower main surface arranged in an up and down direction and includes an antenna that is configured to transmit and/or receive an electromagnetic wave or a magnetic field, and a second circuit board that has a second upper main surface and a second lower main surface arranged in the up and down direction, is located further on a lower side than is the first circuit board, and when viewed in the up and down direction, overlaps with the first circuit board. Moreover, an electrically connecting member is provided that electrically connects the first circuit board to the second circuit board, a semiconductor integrated circuit is provided that is a driving circuit for the antenna, and a first metal case covers the semiconductor integrated circuit. The first metal case and the semiconductor integrated circuit are mounted on a same main surface of the first lower main surface or the second upper main surface, a heat conductive path through which heat is conducted is provided between the first circuit board and the second circuit board and is a path that passes through a solid including the first metal case.

In another exemplary aspect, an antenna component is provided that is attached to a mother component including a second circuit board. The antenna component includes a first circuit board that has a first upper main surface and a first lower main surface arranged in an up and down direction and includes an antenna configured to transmit and/or receive an electromagnetic wave or a magnetic field, an electrically connecting member that electrically connects the first circuit board to the second circuit board, a semiconductor integrated circuit that is mounted on the first lower main surface and is a driving circuit for the antenna, and a first metal case that is mounted on the first lower main surface and covers the semiconductor integrated circuit.

Hereinafter, definitions of terms used in the present specification will be described. In the present specification, an axis or a member extending in a front and back direction does not necessarily indicate only the axis or member parallel to the front and back direction. The axis or member extending in the front and back direction is the axis or member inclined within a range of ±45° with respect to the front and back direction. Similarly, an axis or a member extending in an up and down direction is the axis or member inclined within a range of ±45 with respect to the up and down direction. An axis or a member extending in a left and right direction is the axis or member inclined within a range of ±45 with respect to the left and right direction.

Hereinafter, a positional relationship of members in the present specification will be defined. X to Z are members or portions of an antenna module. In the present specification, X and Y arranged in the front and back direction indicate the following state. When X and Y are viewed in a direction vertical to the front and back direction, X and Y are both located on an optional straight line indicating the front and back direction. In the present specification, X and Y arranged in the front and back direction when viewed in the up and down direction indicates the following state. When X and Y are viewed in the up and down direction, X and Y are both located on an optional straight line indicating the front and back direction. In this case, when X and Y are viewed in the left and right direction, which is different from the up and down direction, one of X and Y does is not necessarily located on the optional straight line indicating the front and back direction. It is also noted that X and Y may be in contact with each other or may be apart from each other. Moreover, Z may exist between X and Y. It is also noted that this definition can be applied to directions other than the front and back direction.

In the present specification, a state in which X is located above Y indicates the following state. At least a part of X is located right above Y. Therefore, when viewed in the up and down direction, X overlaps with Y. This definition can be applied to directions other than the up and down direction.

In the present specification, a state in which X is located further on an upper side than is Y includes a case in which at least a part of X is located right above Y and a case in which X is not located right above Y but is located obliquely above Y. In this case, when viewed in the up and down direction, X does not necessarily overlap with Y. Moreover, the term obliquely above means, for example, upper left and upper right. This definition can be applied to directions other than the up and down direction.

In the present specification, unless otherwise noted, each portion of X will be defined as follows. A front portion of X means a first half of X. A rear portion of X means a latter half of X. A left portion of X means a left half of X. A right portion of X means a right half of X. An upper portion of X means an upper half of X. A lower portion of X means a lower half of X. A front end of X means an end of X in a front direction. A rear end of X means an end of X in a back direction. A left end of X means an end of X in a left direction. A right end of X means an end of X in a right direction. An upper end of X means an end of X in an up direction. A lower end of X means an end of X in a down direction. A front end portion of X means the front end of X and a periphery thereof. A rear end portion of X means the rear end of X and a periphery thereof. A left end portion of X means the left end of X and a periphery thereof. A right end portion of X means the right end of X and a periphery thereof. An upper end portion of X means the upper end of X and a periphery thereof. A lower end portion of X means the lower end of X and a periphery thereof.

According to the exemplary aspects of the present disclosure, reducing the size of an antenna module, improving the communication characteristics, and improving heat dissipation is achieved.

DETAILED DESCRIPTION OF EMBODIMENTS

Exemplary Embodiment

[Configuration of Antenna Module]

Figure 1:
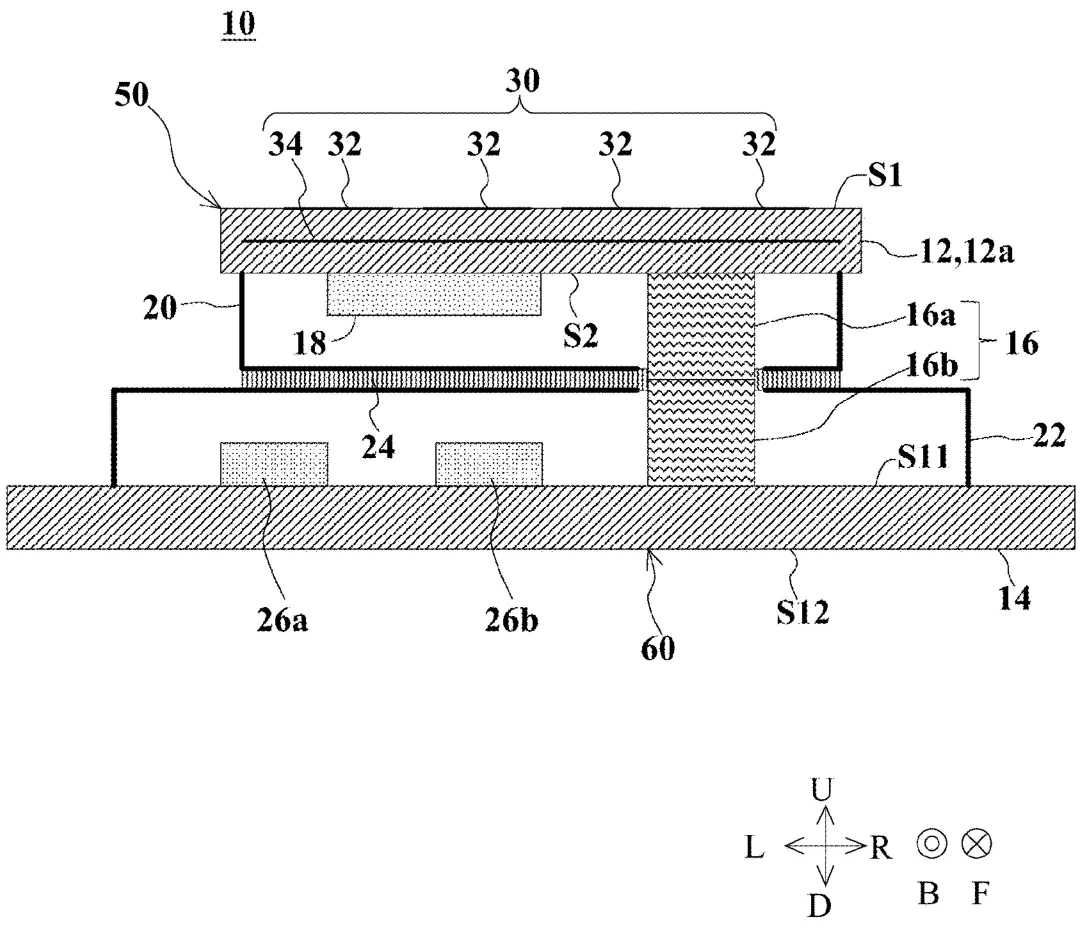
FIG. 1 is a sectional view of an antenna module 10 according to an exemplary aspect.
Figure 2:
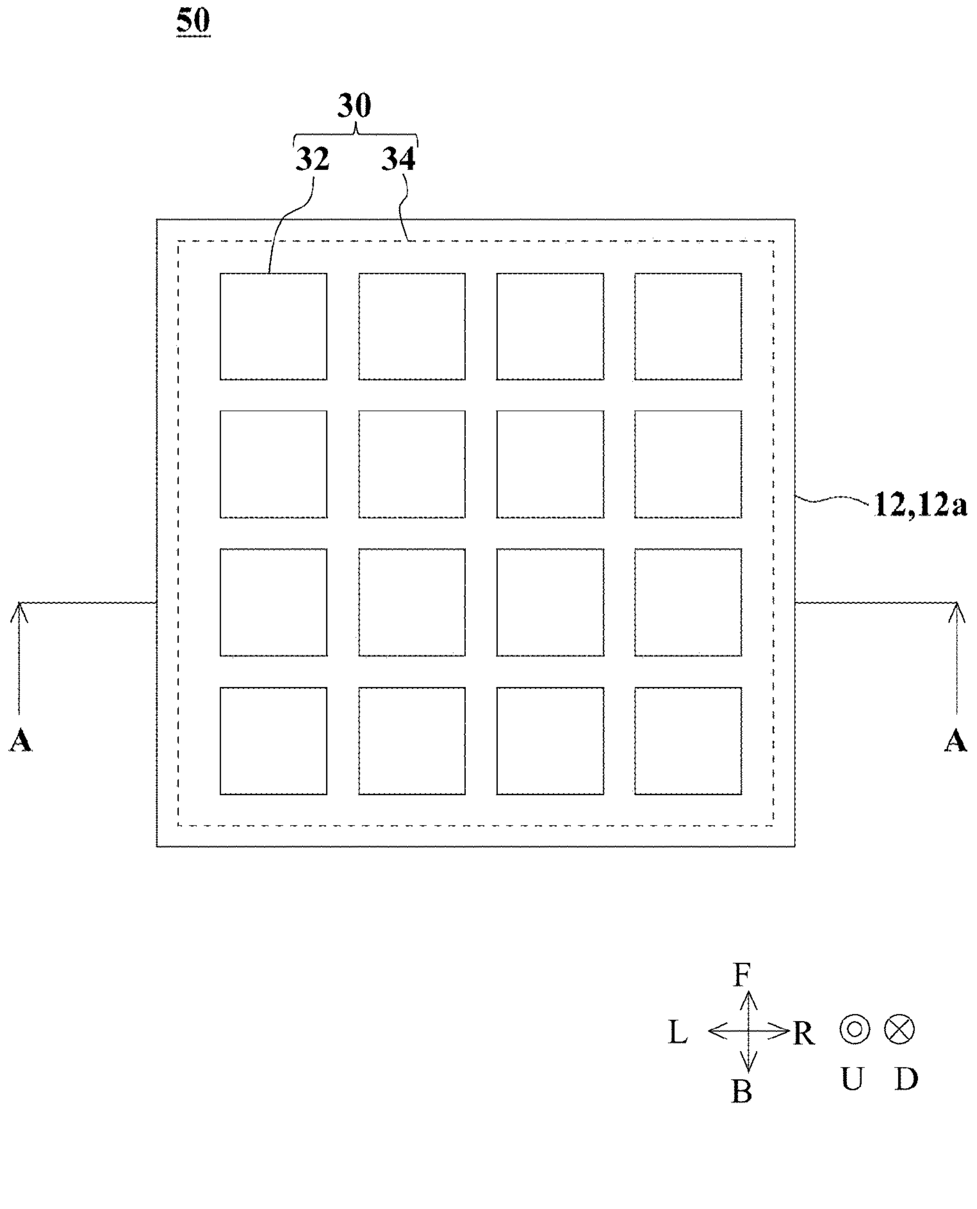
FIG. 2 is a top view of an antenna component 50 according to an exemplary aspect.
Figure 3:
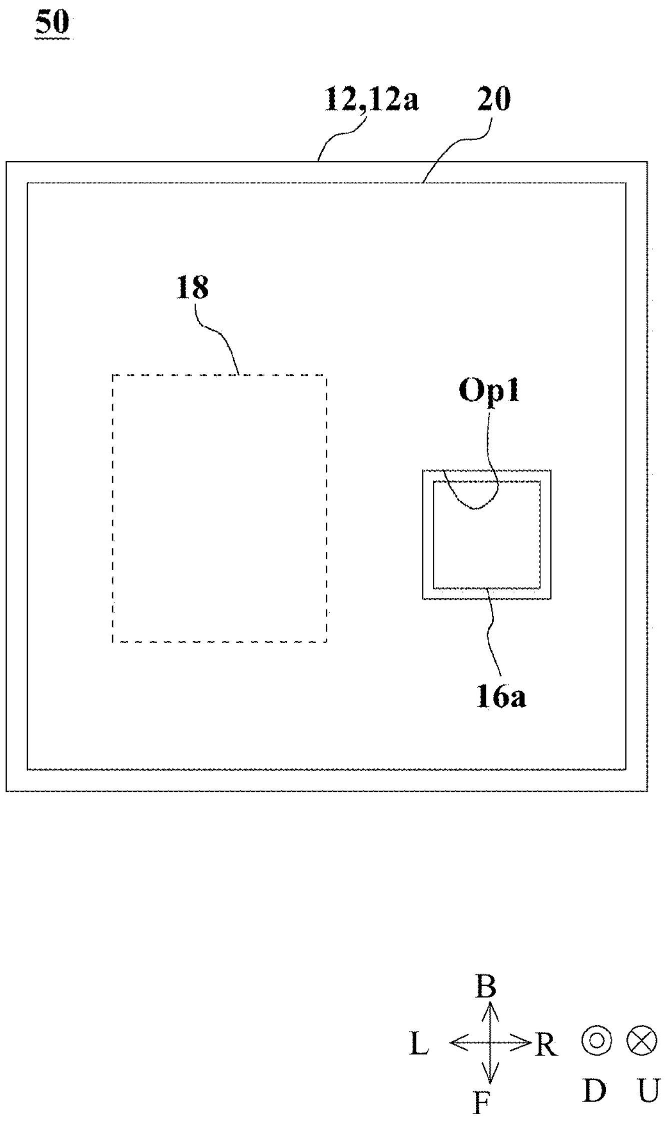
FIG. 3 is a bottom view of the antenna component 50 according to an exemplary aspect.
Figure 4:
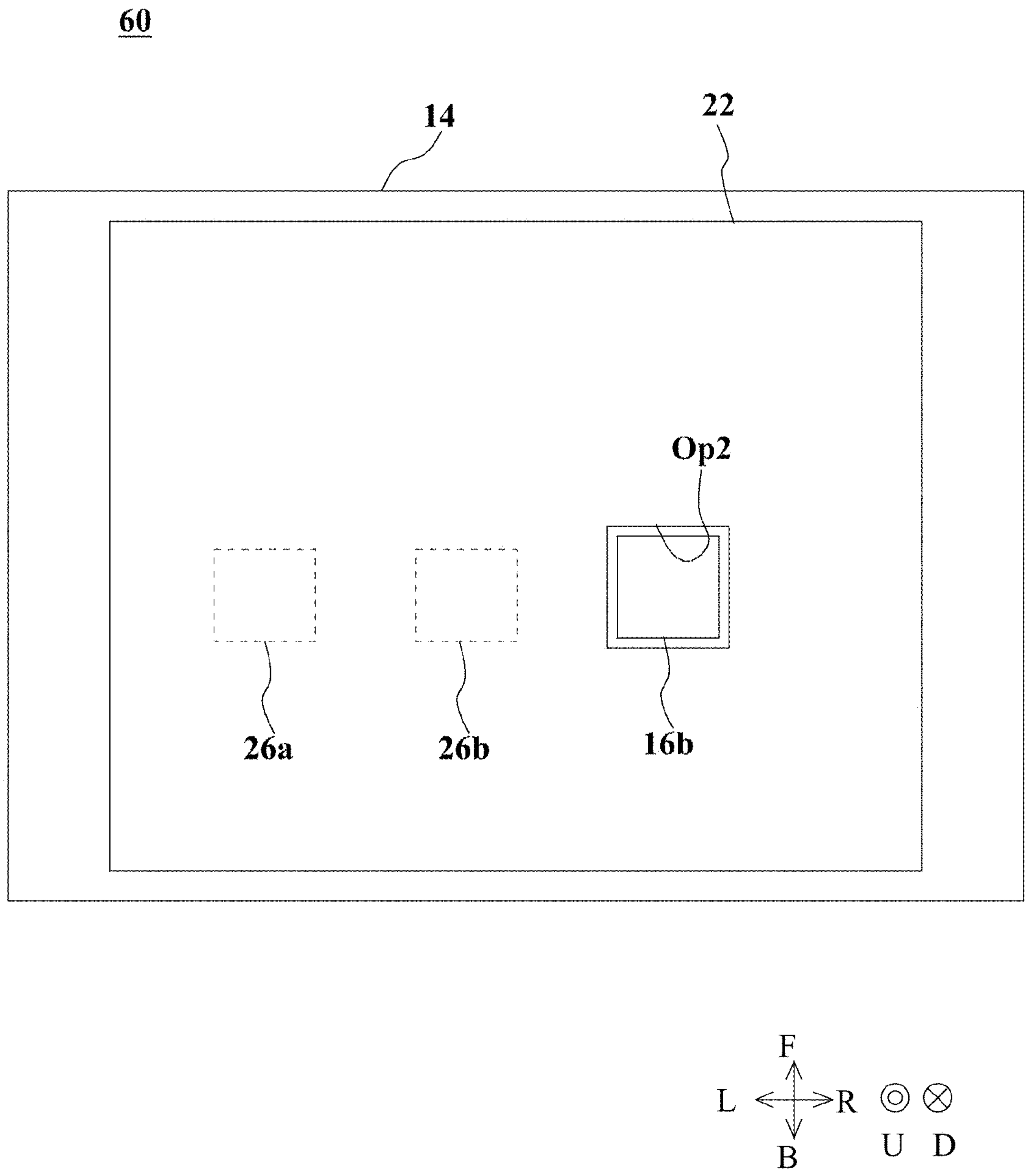
FIG. 4 is a top view of a mother board component 60 according to an exemplary aspect.

Hereinafter, a configuration of an antenna module 10 according to an exemplary embodiment will be described with reference to the drawings. FIG. 1 is a sectional view of the antenna module 10. FIG. 1 is a sectional view taken along line A-A of FIG. 2. FIG. 2 is a top view of an antenna component 50. FIG. 3 is a bottom view of the antenna component 50. FIG. 4 is a top view of a mother board component 60.

In the present specification, a direction in which a first upper main surface S1 and a first lower main surface S2 of a first circuit board 12 are arranged is defined as an up and down direction. In addition, when viewed in the up and down direction, a direction in which a long side of a second circuit board 14 extends is defined as a left and right direction. When viewed in the up and down direction, a direction in which a short side of the second circuit board 14 extends is defined as a front and back direction. The up and down direction, the left and right direction, and the front and back direction are orthogonal to each other. It is noted that the up and down direction, the left and right direction, and the front and back direction are directions defined for explanation of the exemplary aspects. Therefore, the up and down direction, the left and right direction, and the front and back direction do not necessarily coincide with the up and down direction, the left and right direction, and the front and back direction when the antenna module 10 is actually used.

According to exemplary aspects, the antenna module 10 can be configured as, for example, a radar apparatus of an automobile. Specifically, the antenna module 10 can be used for a radar apparatus that measures a distance from an automobile equipped with the radar apparatus to a vehicle existing before the automobile equipped with the radar apparatus, a radar apparatus that detects an obstacle around an automobile equipped with the radar apparatus, or the like. In addition, the antenna module 10 may be used for a radar apparatus that detects a human being existing inside an automobile. That is, the antenna module 10 may be used for a radar apparatus for preventing a child from being left behind in an automobile. As described in FIG. 1, the antenna module 10 includes the first circuit board 12, the second circuit board 14, an electrically connecting member 16, a semiconductor integrated circuit 18, a first metal case 20, a second metal case 22, a bonding member 24, and electronic components 26*a* and 26*b*.

As illustrated in FIG. 1, the first circuit board 12 is a plate-like member. Therefore, the first circuit board 12 has the first upper main surface S1 and the first lower main surface S2 arranged in the up and down direction. In addition, as illustrated in FIGS. 2 and 3, the first circuit board 12 has a rectangular shape when viewed in the up and down direction (e.g., normal to the first upper main surface S1). The first circuit board 12 includes a first circuit board main body 12*a* and an antenna 30.

As illustrated in FIG. 1, the first circuit board main body 12*a* is a plate-like member. The first circuit board main body 12*a* has a structure in which a plurality of insulating layers is laminated in the up and down direction. The antenna 30 is configured to transmit and/or receive an electromagnetic wave or a magnetic field. In the present embodiment, the antenna 30 is a patch antenna that transmits and/or receives an electromagnetic wave. Therefore, the antenna 30 includes a plurality of antenna conductors 32 and a ground conductor 34. As illustrated in FIG. 2, each of the plurality of antenna conductors 32 has a rectangular shape when viewed in the up and down direction. The plurality of antenna conductors 32 is disposed in a matrix when viewed in the up and down direction. The ground conductor 34 has a rectangular shape when viewed in the up and down direction. The ground conductor 34 overlaps with the plurality of antenna conductors 32 when viewed in the up and down direction. It is also noted that the first circuit board 12 includes an electric circuit other than the antenna 30. However, details of the electric circuit other than the antenna 30 are omitted.

As illustrated in FIG. 1, the second circuit board 14 is a plate-like member. Therefore, the second circuit board 14 has a second upper main surface S11 and a second lower main surface S12 arranged in the up and down direction. In addition, as illustrated in FIG. 4, the second circuit board 14 has a rectangular shape when viewed in the up and down direction. As illustrated in FIG. 1, the second circuit board 14 described above is located further on a lower side than is the first circuit board 12. In addition, the second circuit board 14 overlaps with the first circuit board 12 when viewed in the up and down direction. The first circuit board 12 is within an outer edge of the second circuit board 14 when viewed in the up and down direction.

As illustrated in FIG. 1, the electrically connecting member 16 electrically connects the first circuit board 12 to the second circuit board 14. The electrically connecting member 16 is a connector set including two connectors in an exemplary aspect. More specifically, the electrically connecting member 16 includes electrically connecting members 16*a* and 16*b*. Each of the electrically connecting members 16*a* and 16*b* is a connector. The electrically connecting member 16*a* is mounted on the first lower main surface S2. The electrically connecting member 16*b* is mounted on the second upper main surface S11. The electrically connecting member 16*a* is coupled to the electrically connecting member 16*b*.

As illustrated in FIG. 1, the semiconductor integrated circuit 18 is mounted on the first lower main surface S2. In an exemplary aspect, the semiconductor integrated circuit 18 is a driving circuit for the antenna 30, and, more particularly, the semiconductor integrated circuit 18 is configured to convert a digital signal for transmission into an analog signal and to output the analog signal to the antenna 30. In addition, the semiconductor integrated circuit 18 is configured to convert an analog signal output by the antenna 30 into a digital signal and to output the digital signal to the second circuit board 14 through the first circuit board 12 and the electrically connecting member 16.

As illustrated in FIG. 1, the first metal case 20 covers the semiconductor integrated circuit 18. That is, the first metal case 20 exists before and behind, on left and right sides of, and below the semiconductor integrated circuit 18. Thus, in the exemplary aspect, the first metal case 20 has a parallelopiped shape. However, the first metal case 20 does not have an upper surface. In addition, the first metal case 20 is mounted on the first lower main surface S2. Specifically, the first metal case 20 is fixed to a ground electrode (not illustrated) provided on the first lower main surface S2 by soldering. As a result, the first metal case 20 is connected to a ground potential. As described above, the first metal case 20 and the semiconductor integrated circuit 18 are mounted on the same main surface of the first lower main surface S2 or the second upper main surface S11 as described below with respect to FIG. 7.

In addition, as illustrated in FIG. 3, a lower surface of the first metal case 20 is provided with an opening Op1. As a result, the electrically connecting member 16*a* is exposed from the first metal case 20 through the opening Op1. According to an exemplary aspect, the material of the first metal case 20 described above can be, for example, nickel silver (C7521), copper, tin, nickel, brass, aluminum, stainless steel, or the like.

As illustrated in FIG. 1, the electronic components 26*a* and 26*b* are mounted on the second upper main surface S11. According to an exemplary aspect, the electronic components 26*a* and 26*b* can be chip-type electronic components, semiconductor integrated circuits, or the like.

As illustrated in FIG. 1, the second metal case 22 covers the electronic components 26*a* and 26*b*. That is, the second metal case 22 exists before and behind, on left and right sides of, and above the electronic components 26*a* and 26*b*. In an exemplary aspect, the second metal case 22 has a parallelopiped shape. However, the second metal case 22 does not have a lower surface. In addition, the second metal case 22 is mounted on the second upper main surface S11. Specifically, the second metal case 22 is fixed to a ground electrode (not illustrated) provided on the second upper main surface S11 by soldering. As a result, the second metal case 22 is connected to a ground potential.

In addition, as illustrated in FIG. 4, an upper surface of the second metal case 22 is provided with an opening Op2. As a result, the electrically connecting member 16*b* is exposed from the second metal case 22 through the opening Op2.

When viewed in the up and down direction, the second metal case 22 overlaps with the first metal case 20. As a result, the upper surface of the second metal case 22 faces the lower surface of the first metal case 20. However, the bonding member 24 described below exists between the upper surface of the second metal case 22 and the lower surface of the first metal case 20. When viewed in the up and down direction, the first metal case 20 is within an outer edge of the second metal case 22. Moreover, in an exemplary aspect, the material of the second metal case 22 described above can be, for example, nickel silver (C7521), copper, tin, nickel, brass, aluminum, stainless steel, or the like.

The bonding member 24 fixes the first metal case 20 to the second metal case 22. Specifically, the bonding member 24 fixes an upper main surface of the second metal case 22 to the lower main surface of the first metal case 20. The bonding member 24 described above is an adhesive, a heat conductive adhesive sheet, or solder. The adhesive is, for example, RH96L manufactured by CEMEDINE. The heat conductive adhesive is, for example, Hypersoft Heat Dissipation Sheet 5580H-0.5 manufactured by 3M. In this manner, since the bonding member 24, which is a heat conductive adhesive, fixes the first metal case 20 to the second metal case 22, heat generated by the semiconductor integrated circuit 18 is conducted to the second circuit board 14 through the first metal case 20, the bonding member 24, and the second metal case 22. That is, a heat conductive path through which heat is conducted exists between the first circuit board 12 and the second circuit board 14. The heat conductive path is a path that passes through a solid including the first metal case 20. In other words, in the antenna module 10, a heat conductive path through which heat is conducted from the first metal case 20 to the second circuit board 14 exists. In addition, the heat conductive path includes a solid and does not include a liquid and a gas. In the present embodiment, the solid is the first metal case 20, the bonding member 24, and the second metal case 22. In addition, the solid does not include the electrically connecting member 16. It is noted that in the present specification, a state in which "heat is conducted" means a phenomenon in which heat moves (e.g., transfers) from a high temperature side to a low temperature side in an object. Therefore, conduction is different from radiation and convention. However, heat generated by the semiconductor integrated circuit 18 may be transmitted to the second circuit board 14 by radiation or convection, in addition to conduction.

It is also noted that through attachment of the antenna component 50 to the mother board component 60, the antenna module 10 is assembled. Here, the antenna component 50 includes the first circuit board 12, the electrically connecting member 16*a*, the semiconductor integrated circuit 18, and the first metal case 20. The mother board component 60 includes the second circuit board 14, the electrically connecting member 16*b*, the second metal case 22, and the electronic components 26*a* and 26*b*.

[Technical Effects]

According to the antenna module 10, the size of the antenna module 10 is reduced. More specifically, the first metal case 20 is mounted on the first lower main surface S2. As a result, the semiconductor integrated circuit 18, an electronic component, or the like can be mounted on a region of the first lower main surface S2 surrounded by the first metal case 20. That is, the semiconductor integrated circuit 18, an electronic component, or the like can be disposed between the first circuit board 12 and the second circuit board 14. Therefore, even when the size of the antenna module 10 is reduced, a space for disposing the semiconductor integrated circuit 18, an electronic component, or the like is easily provided. Accordingly, the size of the antenna module 10 is reduced.

According to the antenna module 10, the size of the antenna module 10 can be reduced for the following reason as well. More specifically, the second metal case 22 is mounted on the second upper main surface S11. As a result, the electronic components 26*a* and 26*b*, or the like can be mounted on a region of the second upper main surface S11 surrounded by the second metal case 22. That is, the electronic components 26*a* and 26*b*, or the like can be mounted between the first circuit board 12 and the second circuit board 14. In other words, even if the size of the antenna module 10 is reduced, a space for disposing the electronic components 26*a* and 26*b*, or the like is easily provided. Accordingly, the size of the antenna module 10 is reduced.

According to the antenna module 10, the communication characteristics are improved. More specifically, the first circuit board 12 includes the antenna 30. In addition, the first metal case 20 is mounted on the first lower main surface S2 of the first circuit board 12. In addition, the second circuit board 14 is located further on the lower side than is the first circuit board 12. Therefore, the first metal case 20 and the second circuit board 14 do not exist further on the upper side than is the antenna 30. Therefore, the first metal case 20 and the second circuit board 14 do not prevent the antenna 30 from transmitting and receiving an electromagnetic wave. Accordingly, when the antenna 30 has directivity, the degree of freedom in the direction of the antenna 30 for transmitting and receiving an electromagnetic wave is improved. In addition, when the antenna 30 does not have directivity, the angle at which the antenna 30 can transmit and receive an electromagnetic wave becomes wider. Accordingly, according to the antenna module 10, the communication characteristics are improved.

According to the antenna module 10, heat dissipation is improved. More specifically, heat generated by the semiconductor integrated circuit 18 only needs to be efficiently conducted to the second circuit board 14. Therefore, the heat generated by the semiconductor integrated circuit 18 is conducted to the second circuit board 14 through the first circuit board 12 and the electrically connecting member 16. In addition, in the antenna module 10, in addition to the heat conductive path, a heat conductive path through which heat is conducted exists between the first circuit board 12 and the second circuit board 14. The heat conductive path is a path that passes through a solid including the first metal case 20. As a result, the heat generated by the semiconductor integrated circuit 18 is conducted to the second circuit board 14 through the first metal case 20, the bonding member 24, and the second metal case 22. As described above, in the antenna module 10, since a plurality of heat conductive paths exists, heat dissipation is improved.

Figure 5:
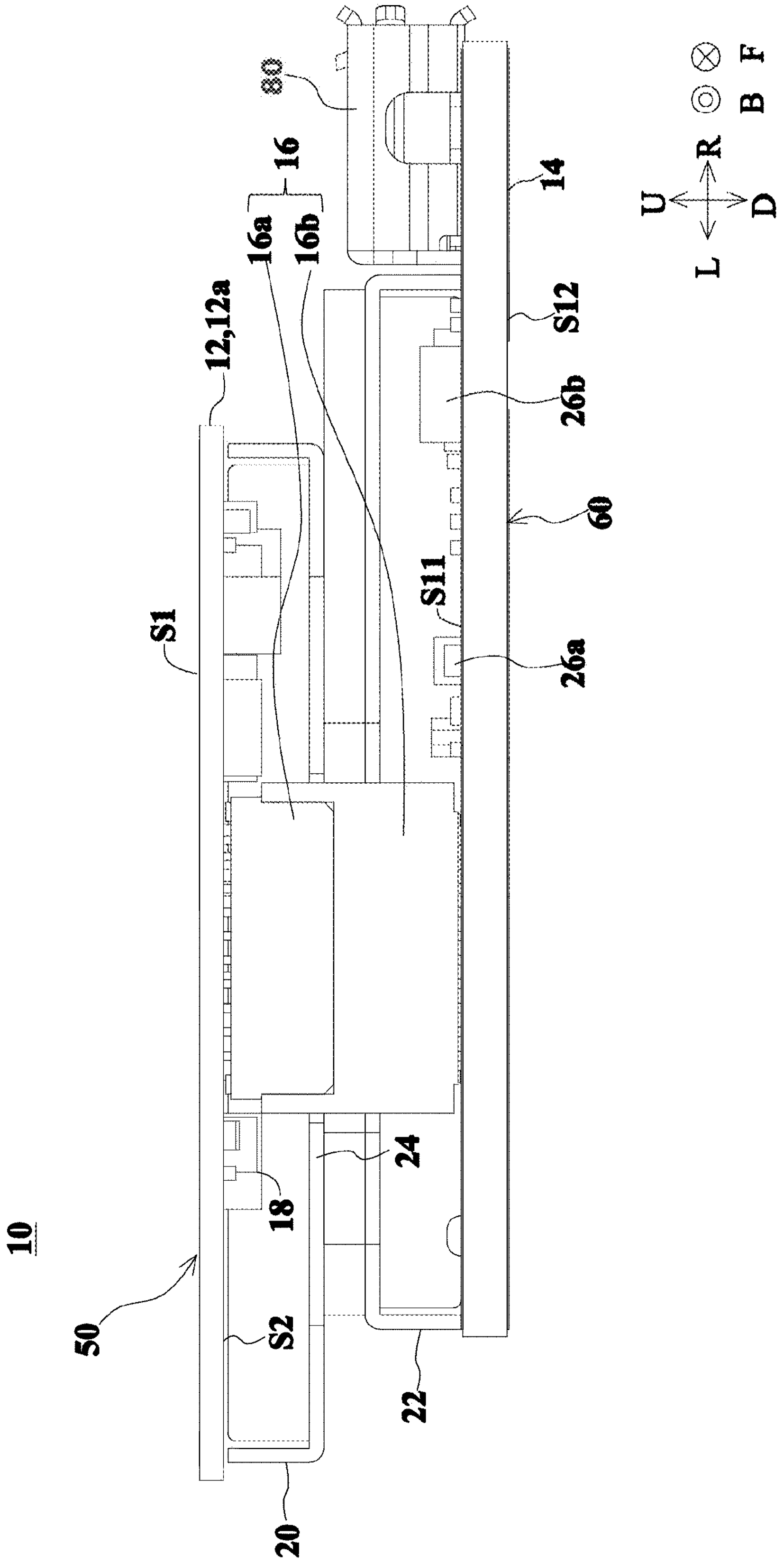
FIG. 5 is a sectional view of an example of the antenna module 10 according to an exemplary aspect.

Hereinafter, an example of the antenna module 10 will be briefly described. FIG. 5 is a sectional view of an example of the antenna module 10.

The antenna module 10 further includes a connector 80. The connector 80 is mounted on an upper main surface of the second circuit board 14. The connector 80 is used for connecting the antenna module 10 to another circuit board.

First Modification

Figure 6:
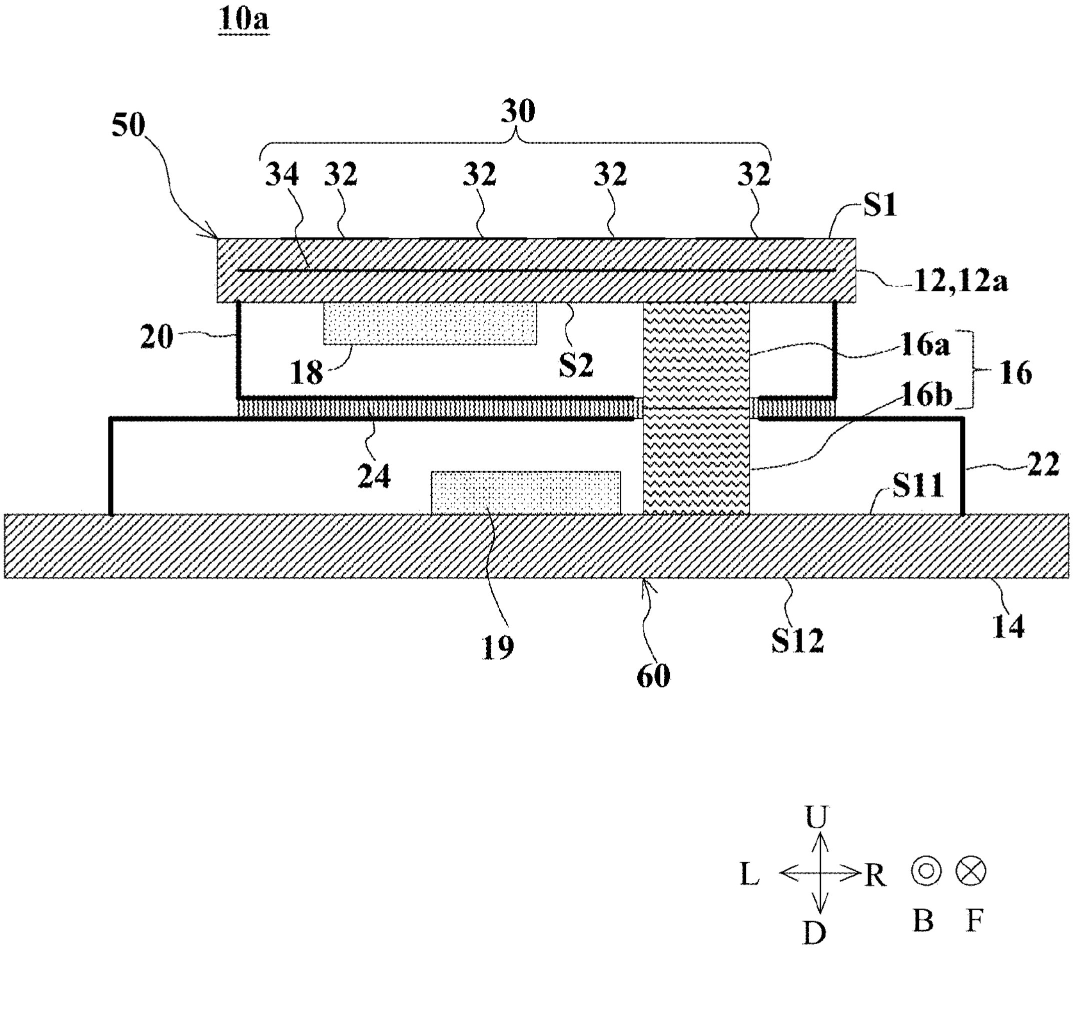
FIG. 6 is a sectional view of an antenna module 10*a* according to an exemplary aspect.

Hereinafter, an antenna module 10*a* according to a first modification of the exemplary embodiment will be described with reference to the drawings. FIG. 6 is a sectional view of the antenna module 10*a*.

The antenna module 10*a* is different from the antenna module 10 in that the antenna module 10*a* includes a semiconductor integrated circuit 19 instead of the electronic components 26*a* and 26*b*. In this aspect, the semiconductor integrated circuit 19 is a central processing unit (CPU), a micro processing unit (MPU), a graphics processing unit (GPU), or the like. The semiconductor integrated circuit 19 controls, for example, operation of the semiconductor integrated circuit 18. In addition, the semiconductor integrated circuit 19 may be a device that communicates with a device to which the antenna module 10*a* is connected. Other configurations of the antenna module 10*a* are the same as those of the antenna module 10, and thus description thereof will be omitted. In addition, the antenna module 10*a* can exhibit the same effects as those of the antenna module 10.

Second Modification

Figure 7:
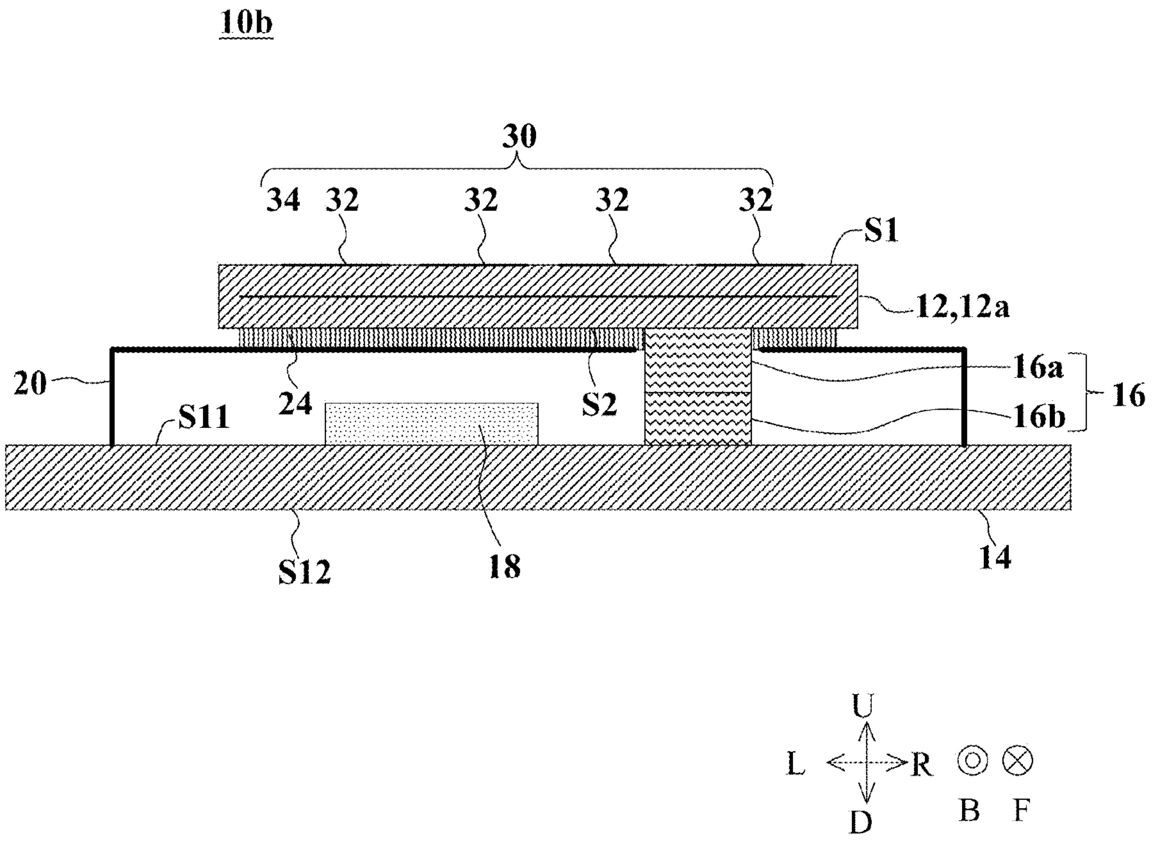
FIG. 7 is a sectional view of an antenna module 10*b* according to an exemplary aspect.

Hereinafter, an antenna module 10*b* according to a second modification of the exemplary embodiment will be described with reference to the drawings. FIG. 7 is a sectional view of the antenna module 10*b*.

The antenna module 10*b* is different from the antenna module 10 in the following points:

- The antenna module 10*b* does not include the second metal case 22.
- The semiconductor integrated circuit 18 is mounted on the second upper main surface S11.
- The first metal case 20 is mounted on the second upper main surface S11.
- The bonding member 24 fixes the first metal case 20 to the first circuit board 12.

Since the antenna module 10*b* has the above structure, a heat conductive path, through which heat is conducted from the first metal case 20 to the first circuit board 12 without passing through the electrically connecting member 16, exists. Other configurations of the antenna module 10*b* are the same as those of the antenna module 10, and thus description thereof will be omitted. In addition, the antenna module 10*b* exhibits the same effects as those of the antenna module 10.

In addition, according to the antenna module 10*b*, heat dissipation is improved. More specifically, heat generated by the semiconductor integrated circuit 18 only should be efficiently conducted to the first circuit board 12. Therefore, the heat generated by the semiconductor integrated circuit 18 is conducted to the first circuit board 12 through the second circuit board 14 and the electrically connecting member 16. In addition, in the antenna module 10*b*, in addition to the heat conductive path, a heat conductive path through which heat is conducted exists between the first circuit board 12 and the second circuit board 14. The heat conductive path is a path that passes through a solid including the first metal case 20. As a result, the heat generated by the semiconductor integrated circuit 18 is conducted to the first circuit board 12 through the first metal case 20 and the bonding member 24. As described above, in the antenna module 10*b*, since a plurality of heat conductive paths exists, heat dissipation is improved.

Third Modification

Figure 8:
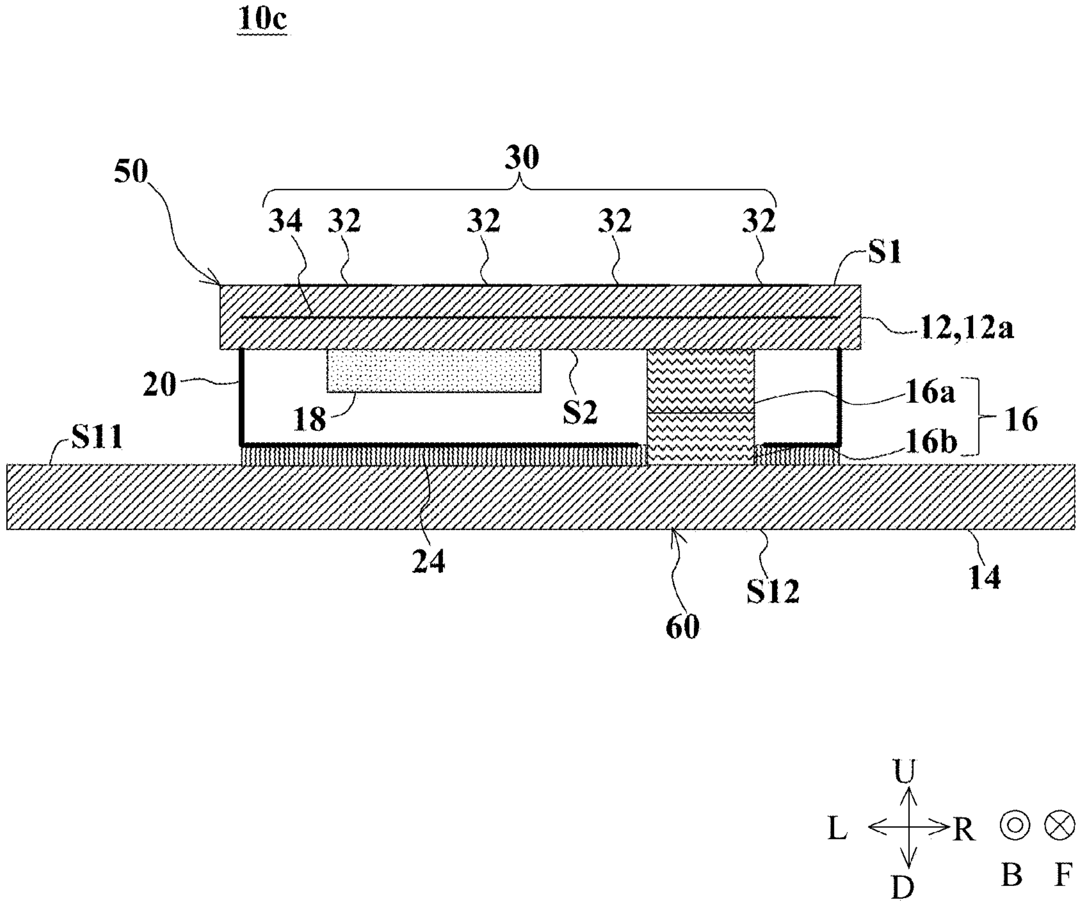
FIG. 8 is a sectional view of an antenna module 10*c* according to an exemplary aspect.

Hereinafter, an antenna module 10*c* according to a third modification of the exemplary embodiment will be described with reference to the drawings. FIG. 8 is a sectional view of the antenna module 10*c*.

The antenna module 10*c* is different from the antenna module 10 in the following points:

The antenna module 10*c* does not include the second metal case 22.

The bonding member 24 fixes the first metal case 20 to the second circuit board 14.

Other configurations of the antenna module 10*c* are the same as those of the antenna module 10, and thus description thereof will be omitted. In addition, the antenna module 10*c* exhibits the same effects as those of the antenna module 10. Note that the antenna module 10*c* has higher heat dissipation than the antenna module 10*b*.

Fourth Modification

Figure 9:
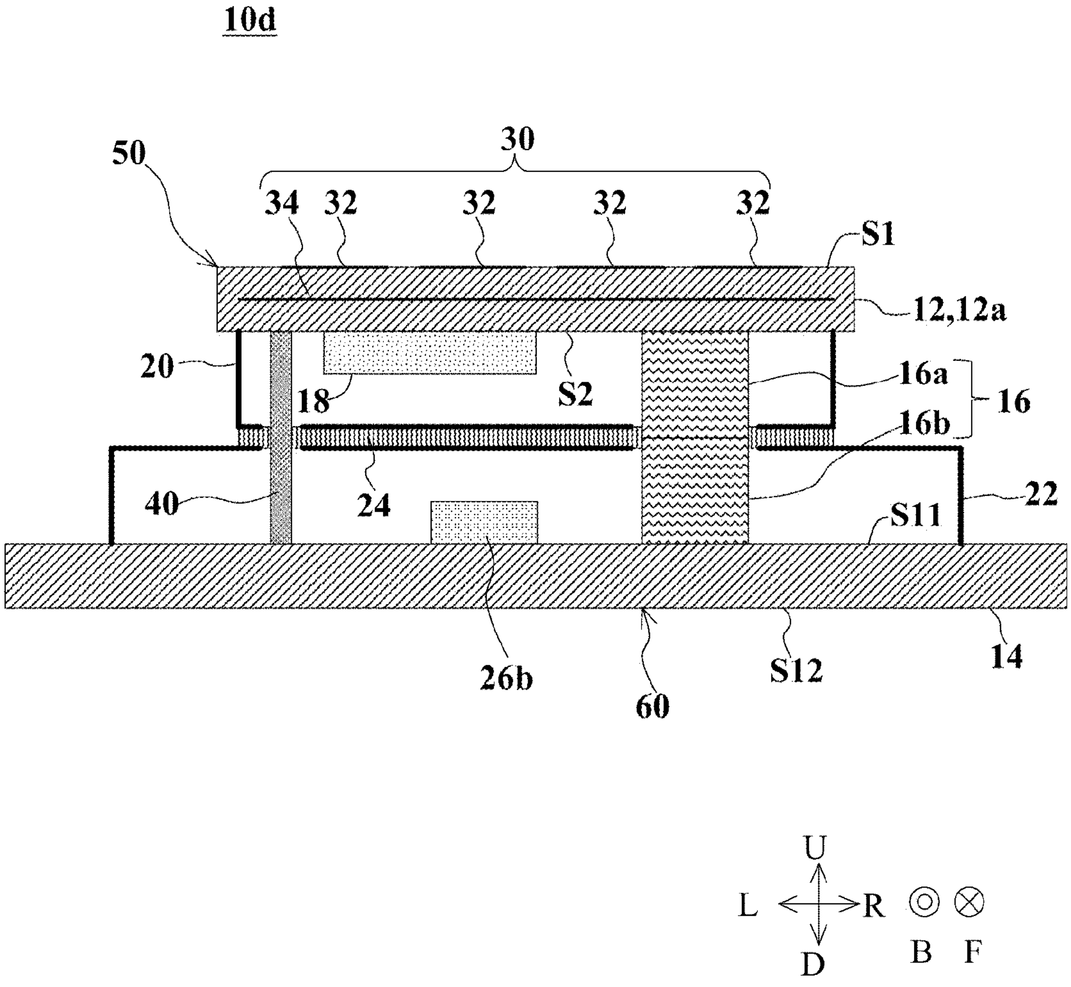
FIG. 9 is a sectional view of an antenna module 10*d* according to an exemplary aspect.

Hereinafter, an antenna module 10*d* according to a fourth modification of the exemplary embodiment will be described with reference to the drawings. FIG. 9 is a sectional view of the antenna module 10*d*.

The antenna module 10*d* is different from the antenna module 10 in that the antenna module 10*d* further includes a heat conductive member 40 that is a metal member extending in the up and down direction. The heat conductive member 40 couples the first circuit board 12 to the second circuit board 14. As a result, heat generated by the semiconductor integrated circuit 18 is conducted from the first circuit board 12 to the second circuit board 14 through the heat conductive member 40. Other configurations of the antenna module 10*d* are the same as those of the antenna module 10, and thus description thereof will be omitted. In addition, the antenna module 10*d* exhibits the same effects as those of the antenna module 10.

Fifth Modification

Figure 10:
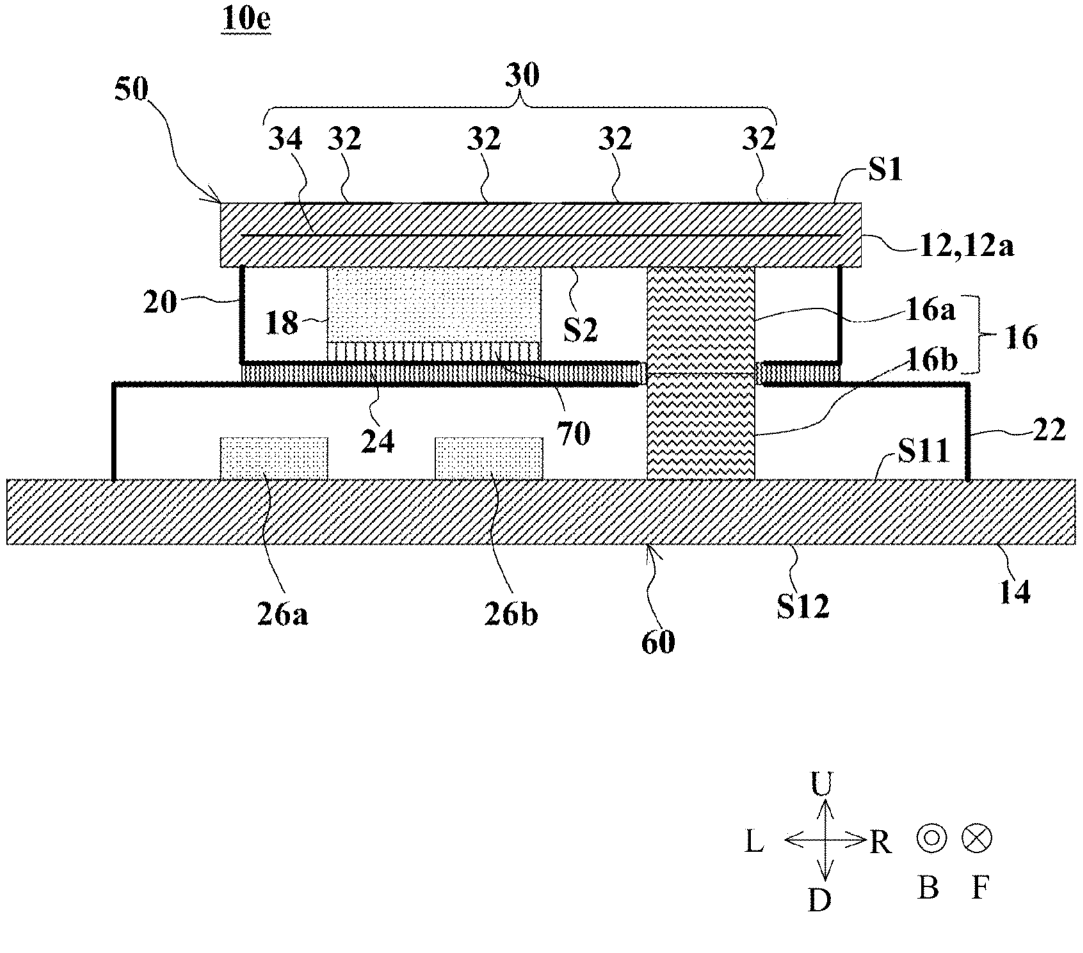
FIG. 10 is a sectional view of an antenna module 10*e* according to an exemplary aspect.

Hereinafter, an antenna module 10*e* according to a fifth modification of the exemplary embodiment will be described with reference to the drawings. FIG. 10 is a sectional view of the antenna module 10*e*.

The antenna module 10*e* is different from the antenna module 10 in that the antenna module 10*e* further includes a heat conductive bonding member 70. More specifically, the heat conductive bonding member 70 fixes the semiconductor integrated circuit 18 to the first metal case 20. Specifically, the heat conductive bonding member 70 fixes a lower main surface of the semiconductor integrated circuit 18 to an upper main surface of the first metal case 20. In an exemplary aspect, the heat conductive bonding member 70 described above is an adhesive, a heat conductive adhesive sheet, or solder. The adhesive is, for example, RH96L manufactured by CEMEDINE. The heat conductive adhesive is, for example, Hypersoft Heat Dissipation Sheet 5580H-0.5 manufactured by 3M. In this manner, since the conductive bonding member 70, which is a heat conductive adhesive, fixes the semiconductor integrated circuit 18 to the first metal case 20, heat generated by the semiconductor integrated circuit 18 is conducted to the second circuit board 14 through the heat conductive bonding member 70, the first metal case 20, the bonding member 24, and the second metal case 22. Other configurations of the antenna module 10*e* are the same as those of the antenna module 10, and thus description thereof will be omitted. The antenna module 10*e* exhibits the same effects as those of the antenna module 10.

Additional Exemplary Embodiments

The antenna module according to the exemplary aspects described above is not limited to the antenna modules 10, 10*a* to 10*e* and can be modified within the range of the concept of the present disclosure. It is also noted that components of the antenna modules 10, 10*a* to 10*e* may be appropriately combined.

It should be appreciated that the electronic components 26*a* and 26*b* can be omitted in alternative exemplary aspects.

It is also noted that the antenna 30 is not limited to a patch antenna. The antenna 30 may be a coil antenna having a spiral shape, a dipole antenna, or a monopole antenna. In addition, the antenna 30 may be formed inside the first circuit board 12 by a conductive layer, or may be mounted on the first upper main surface S1 so as to occupy a part of the first circuit board 12.

Note that the antenna modules 10, 10*a* to 10*e* may be electrically connected by an electric control unit (ECU). In this case, a semiconductor integrated circuit (not illustrated), which is a communication circuit for communicating with the ECU may be mounted on the second circuit board 14.

Note that the electrically connecting member 16 is not limited to a connector. For example, the electrically connecting member 16 may be a combination of a flexible printed board and a connector in alternative aspects.

Note that the antenna modules 10, 10*a* to 10*e* may be applied to an apparatus other than a radar apparatus. The antenna modules 10, 10*a* to 10*e* may be used for a communication device. In addition, the antenna modules 10, 10*a* to 10*e* may be used for a wireless power supply apparatus.

Note that the antenna 30 may only receive an electromagnetic wave, may only transmit an electromagnetic wave, or may transmit and receive an electromagnetic wave.

Note that the antenna 30 may only receive a magnetic field, may only transmit a magnetic field, or may transmit and receive a magnetic field.

REFERENCE SIGNS LIST

10, 10*a* to 10*e* antenna module
12 first circuit board
12*a* first circuit board main body
14 second circuit board
16, 16*a*, 16*b* electrically connecting member
18, 19 semiconductor integrated circuit
20 first metal case
22 second metal case
24 bonding member
26*a*, 26*b* electronic component
30 antenna
32 antenna conductor
34 ground conductor
40 heat conductive member
50 antenna component
60 mother board component
70 conductive bonding member
Op1, Op2 opening
S1 first upper main surface
S11 second upper main surface
S12 second lower main surface
S2 first lower main surface

What is claimed:

1. An antenna module comprising:

a first circuit board that has a first upper main surface and a first lower main surface arranged in an up and down direction and that includes an antenna;

a second circuit board that has a second upper main surface that faces the first lower main surface and a second lower main surface arranged in the up and down direction, and overlaps the first circuit board when viewed in the up and down direction;

an electrically connecting member that electrically connects the first circuit board to the second circuit board;

a semiconductor integrated circuit configured as a driving circuit for the antenna;

a first metal case that covers the semiconductor integrated circuit;

a second metal case that is mounted on the second upper main surface; and a bonding member that fixes the first metal case to the second metal case, wherein the first metal case and the semiconductor integrated circuit are both mounted on either the first lower main surface or the second upper main surface, and wherein a heat conductive path is configured between the first circuit board and the second circuit board and passes through at least the first metal case.

2. The antenna module according to claim 1, wherein the antenna is configured to transmit and/or receive an electromagnetic wave or a magnetic field.

3. The antenna module according to claim 1, wherein:

the semiconductor integrated circuit is mounted on the first lower main surface, and the first metal case is mounted on the first lower main surface.

4. The antenna module according to claim 1, further comprising an additional bonding member that fixes the first metal case to the first circuit board.

5. The antenna module according to claim 4, wherein:

the semiconductor integrated circuit is mounted on the second upper main surface, and the first metal case is mounted on the second upper main surface.

6. The antenna module according to claim 1, further comprising an additional bonding member that fixes the first metal case to the second circuit board.

7. The antenna module according to claim 6, wherein:

the semiconductor integrated circuit is mounted on the first lower main surface, and the first metal case is mounted on the first lower main surface.

8. The antenna module according to claim 1, further comprising a heat conductive member that couples the first circuit board to the second circuit board.

9. The antenna module according to claim 1, further comprising a heat conductive bonding member that fixes the semiconductor integrated circuit to the first metal case.

10. An antenna module comprising:

a first circuit board that includes an antenna and that has a first upper main surface and a first lower main surface that oppose each other;

a second circuit board that has a second upper main surface that faces the first lower main surface and a second lower main surface that opposes second upper main surface, the second circuit board at least partially overlapping the first circuit board in a plan view thereof;

an electrically connecting member that electrically connects the first circuit board to the second circuit board;

a semiconductor integrated circuit configured as a driving circuit for the antenna and mounted on the second upper main surface;

a first metal case mounted on the second upper main surface to cover the semiconductor integrated circuit;

a second metal case that is mounted on the second upper main surface of the second circuit board;

a bonding member that fixes the first metal case to the first lower main surface of the first circuit board; and an additional bonding member that fixes the first metal case to the second metal case.

11. The antenna module according to claim 10, wherein a heat conductive path is configured between the first circuit board and the second circuit board and passes through at least the first metal case.

12. The antenna module according to claim 10, wherein the antenna is configured to transmit and/or receive an electromagnetic wave or a magnetic field.

13. An antenna component attached to a mother component including a second circuit board, the antenna component comprising:

a first circuit board that has a first upper main surface and a first lower main surface arranged in an up and down direction and that includes an antenna;

an electrically connecting member that electrically connects the first circuit board to the second circuit board;

a semiconductor integrated circuit that is mounted on the first lower main surface and is configured as a driving circuit for the antenna;

a first metal case that is mounted on the first lower main surface and covers the semiconductor integrated circuit;

a second metal case that is mounted on an upper main surface of the second circuit board; and a bonding member that fixes the first metal case to the second metal case.

14. The antenna component according to claim 13, wherein the antenna is configured to transmit and/or receive an electromagnetic wave or a magnetic field.

15. The antenna component according to claim 13, wherein:

the semiconductor integrated circuit is mounted on the first lower main surface, and the first metal case is mounted on the first lower main surface.

16. The antenna component according to claim 13, further comprising:

an additional bonding member that fixes the first metal case to the first circuit board, wherein:

the semiconductor integrated circuit is mounted on the upper main surface of the second circuit board, and the first metal case is mounted on the upper main surface of the second circuit board.

17. The antenna component according to claim 13, further comprising:

an additional bonding member that fixes the first metal case to the second circuit board, wherein:

the semiconductor integrated circuit is mounted on the first lower main surface, and the first metal case is mounted on the first lower main surface.

18. The antenna component according to claim 13, further comprising a heat conductive member that couples the first circuit board to the second circuit board.

* * * * *